United States Patent
Kadula et al.

(10) Patent No.: US 11,912,492 B2
(45) Date of Patent: Feb. 27, 2024

(54) AEROSOL DISPENSING VALVE SYSTEM AND A CONTAINER COMPRISING AN AEROSOL DISPENSING VALVE SYSTEM

(71) Applicants: Marcin Kadula, Jaworzno (PL); Wieslaw Kadula, Jaworzno (PL); Sebastian Korczyk, Jaworzno (PL); Stanislaw Korczyk, Jaworzno (PL)

(72) Inventors: Marcin Kadula, Jaworzno (PL); Wieslaw Kadula, Jaworzno (PL); Sebastian Korczyk, Jaworzno (PL); Stanislaw Korczyk, Jaworzno (PL)

( * ) Notice: Subject to any disclaimer, the term of this patent is extended or adjusted under 35 U.S.C. 154(b) by 0 days.

(21) Appl. No.: 17/778,502

(22) PCT Filed: Nov. 18, 2020

(86) PCT No.: PCT/IB2020/060880
§ 371 (c)(1),
(2) Date: May 20, 2022

(87) PCT Pub. No.: WO2021/099971
PCT Pub. Date: May 27, 2021

(65) Prior Publication Data
US 2022/0411171 A1      Dec. 29, 2022

(30) Foreign Application Priority Data
Nov. 20, 2019   (PL) .......................................... 431861

(51) Int. Cl.
*B65D 83/52*   (2006.01)
*B65D 83/54*   (2006.01)
*B65D 83/62*   (2006.01)

(52) U.S. Cl.
CPC ............. *B65D 83/54* (2013.01); *B65D 83/62* (2013.01)

(58) Field of Classification Search
CPC ........ B65D 83/38; B65D 83/62; B65D 83/68; B65D 83/682; B65D 83/00; B65D 83/14;
(Continued)

(56) References Cited

U.S. PATENT DOCUMENTS 3,138,301 A * 6/1964 Ward .................... B65D 83/546
                                                 222/335
3,221,946 A * 12/1965 Riley ..................... B65D 83/44
                                                 222/394

(Continued)

FOREIGN PATENT DOCUMENTS

| JP | H0266259 U | 5/1990 |
| JP | H06336272 A | 12/1994 |
| JP | 2015131681 A | 7/2015 |

OTHER PUBLICATIONS

PCT International Search Report and Written Opinion in PCT/IB2020/060880 dated May 3, 2021, 2 pages.

*Primary Examiner* — Charles P. Cheyney
(74) *Attorney, Agent, or Firm* — Servilla Whitney LLC

(57) ABSTRACT

The present invention relates to an aerosol dispensing valve system for dispensing a metered dose of a product, comprising a first aerosol valve, fluidly connected with the first reservoir, wherein the first aerosol valve comprises a first releasing stem connected with a first closure, a first outlet channel for discharging the product, a first inner seal resiliently deformed by the first releasing stem, and a first body portion defining a first cavity, wherein the first reservoir is fluidly connected with the first cavity through the supply channel, and the first cavity is fluidly connected with a dispensing container provided with resilient means for compressing the dispensing container, wherein the dispensing container is arranged in a rigid limiting container.

17 Claims, 6 Drawing Sheets

Figure 1:
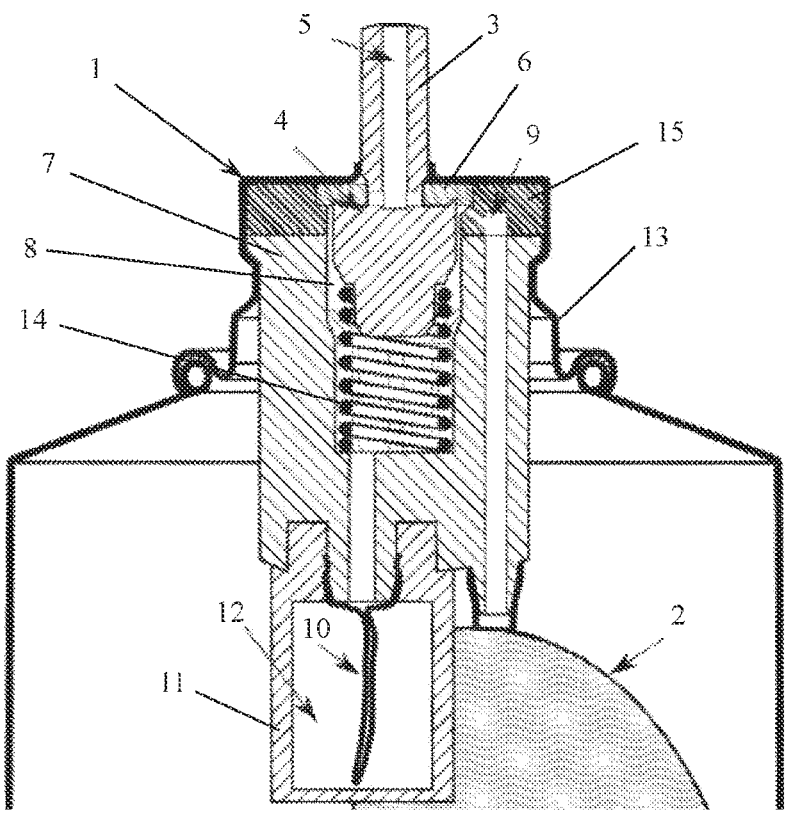

(58) Field of Classification Search
CPC ......... B65D 83/16; B65D 83/48; B05B 11/00;
B05B 11/04; B05B 11/06; B05B 15/55;
B05B 15/555; B05B 15/557; B05B 15/58
USPC ................ 222/135, 136, 40.2, 402.18, 94
See application file for complete search history.

(56) References Cited

U.S. PATENT DOCUMENTS

| | | | | |
|---|---|---|---|---|
| 3,235,135 | A * | 2/1966 | Blanie ................ | G01F 11/08 |
| | | | | 222/394 |
| 3,245,435 | A * | 4/1966 | Healy ................ | B65D 83/62 |
| | | | | 141/3 |
| 3,360,168 | A * | 12/1967 | Bret .................... | A61J 7/00 |
| | | | | 222/335 |
| 3,858,771 | A * | 1/1975 | Bret .................... | F16K 1/306 |
| | | | | 222/402.2 |
| 4,433,797 | A * | 2/1984 | Galia ................. | B65D 83/54 |
| | | | | 222/335 |
| 4,577,784 | A * | 3/1986 | Brunet ............... | B65D 83/525 |
| | | | | 239/350 |
| 4,809,888 | A * | 3/1989 | Suck ................. | B65D 83/546 |
| | | | | 137/625.68 |
| 4,915,262 | A * | 4/1990 | Suck ................. | B65D 83/546 |
| | | | | 137/625.68 |
| 5,520,310 | A * | 5/1996 | Bauer ................ | B65D 83/52 |
| | | | | 222/402.2 |
| 6,273,304 | B1 * | 8/2001 | Hoshino ............ | B65D 83/54 |
| | | | | 222/402.2 |
| 7,104,424 | B2 * | 9/2006 | Kolanus ............ | B65D 83/205 |
| | | | | 177/245 |
| 10,399,767 | B2 * | 9/2019 | Plaschkes ......... | B65D 83/425 |
| 10,661,291 | B2 * | 5/2020 | Schmid ............. | B65D 83/546 |
| 2019/0071242 | A1 * | 3/2019 | Bartolucci ........ | G01F 11/088 |

* cited by examiner

AEROSOL DISPENSING VALVE SYSTEM AND A CONTAINER COMPRISING AN AEROSOL DISPENSING VALVE SYSTEM

CROSS REFERENCE TO RELATED APPLICATIONS

This is a National Phase entry of International Application No. PCT/IB2020/060880, filed Nov. 18, 2020, which claims priority to Polish Patent Application No. PL20190431861, filed Nov. 20, 2019, the disclosures of which are incorporated herein by reference in their entireties.

The invention relates to an aerosol dispensing valve system and a container comprising an aerosol dispensing valve system. The objects of the invention are applied inter alia in pharmaceutical, food, cosmetic, and chemical industries, particularly for storing and dispensing agents at a predefined volume.

In recent years, a dynamic development of aerosol technologies, which allows the storing and administering of a wide range of products, has been observed. Aerosol containers have gained enormous popularity, as they offer efficiency, convenience and safety of use. Generally, an aerosol container is a disposable or reusable vessel, made of metal, glass, or plastic, containing pressurized, liquefied, or dissolved gas. Aerosol containers can also contain liquid, paste or powder, and are usually equipped with a dispensing device, enabling the application of the product in a form of solid or liquid particles suspended in gas, or in a form of foam, paste, or powder, or in a liquid or gaseous state. A classic aerosol container comprises a sprayed agent (e.g. in liquid form) and a propellant, being a fluid or a gas under pressure. Triggering the aerosol valve causes the valve to be opened and the sprayed agent to be discharged by the pressurized propellant towards the outlet, usually ended with a dispensing head, thus creating a finely dispersed stream.

Aerosol packages gained their popularity due to a number of advantages that they offer. Products stored in aerosol packages usually have long lifespan, mainly because of a hermetic sealing which prevents the contact between the stored product and the environment, especially pollutants and microorganisms. This advantage is particularly appreciated for storing pharmaceutical agents, where maintaining maximal purity is an essential factor. It should also be noted that, in time of a rising issue of global pollution, it is desirable to use packages that are mostly suitable for recycling, which the aerosol packages undoubtedly are, since they are usually manufactured from aluminum and plastic, almost entirely suitable for reprocessing.

In some branches of industry, aerosol systems are slow to gain appreciation and thus are not often the first choice for dispensing components. An especially demanding branch of industry is the pharmaceutical industry, in which medical substances must be dispensed under very stringent conditions. It is particularly important to provide the dispensation of a medical substance at a precisely metered dose, which frequently translates into the volume of this pharmaceutical substance. It is vital for controlling the particular amount of an active medical substance delivered to the organism. It is equally important to maintain highly repeatable metering of the doses of the dispensed substance, particularly in the case when the volume in the dispensing container decreases at every act of dispensing.

U.S. patent application No. US2015353267A1 discloses an aerosol valve for dispensing a metered volume of liquid. The aerosol valve comprises a side metering reservoir, which allows a metered volume of the product to be dispensed. The reservoir consists of an upper part, which is non-elastic, and of a lower part in the form of a flexible membrane, thus providing a semi-elastic metering reservoir. When the valve is in the rest position, the metering reservoir is filled to the volume limited by the ability of the membrane to expand. After the stem is pushed, the communication channel between the metering reservoir and the receptacle is closed, and the passage between the metering reservoir and the dispensing channel is opened. The pressure difference and the elasticity of the membrane allow the contents of the metering reservoir to be discharged outside.

U.S. patent application No. US2018141745A1 discloses an aerosol valve for dispensing a metered volume of product. The valve comprises a dispensing reservoir arranged in a receptacle. The dispensing reservoir consists of an inner portion, which is rigid, and of an outer portion in the form of a flexible membrane. This system forms a semi-flexible reservoir. When the valve is in closed position, the sprayed product is introduced into the reservoir, filling it up to the volume limited by the ability of the membrane to expand. After the stem is pushed, the channel connecting the reservoir with the receptacle is closed and the channel leading to the outside of the valve is opened. The reservoir is thus emptied.

Another U.S. patent application No. US2015239645A1 discloses a valve system for dosing a predetermined quantity of content, particularly in the form of foam. The valve system comprises a cap which is mounted on the valve and which houses a metering chamber. The volume of a dose is regulated by turning the cap and thus by changing the volume of the metering chamber. The system is based on a valve, which fills the metering chamber during the phase of pushing the stem, and which opens the discharge to the dispensing nozzle and discharges the contents outside the metering chamber during the phase of releasing the stem.

U.S. Pat. No. 3,301,444A discloses an aerosol valve allowing a predetermined measured volume of product to be dispensed, the valve comprising a measuring chamber, which has its volume defined by the dose, and which is filled with the product when the valve is in closed position. The pressing of an actuator stem closes the metering chamber inlet aperture and opens the discharge outlet through the dispensing head. In such a case, the valve discharges the volume of a product contained in the measuring chamber.

A container for dispensing a dose of the product is also known from U.S. Pat. No. 5,031,802A. The container comprises a valve system fitted inside a bottleneck. The valve system comprises a metering chamber. The metering chamber is made of an elastic material in the form of a bellows. In order to discharge a metered dose of a product, a cap must be first removed. The removal of the cap causes the volume of the metering chamber to increase and creates a negative pressure. The negative pressure frees a ball which blocks a conduit connected with a plunger tube. In this manner, the conduit is opened, and the metering chamber is filled with the product. Complete unscrewing of the cap breaks the fluid-tightness and causes the ball to drop. Thus, the user is provided with a metered volume of a product. The technical problem of the present invention is to provide such an aerosol dispensing valve system and a container comprising such an aerosol dispensing valve system which would allow an accurately metered volume of a product to be dispensed while maintaining highly repeatable doses until the container is completely emptied, this being achieved regardless of the surrounding conditions such as ambient temperature or the viscosity of the dispensed product. It is also desirable that the aerosol dispensing valve system has a relatively simple construction, which would in particular not influence the structure and external dimensions of the aerosol dispensing valve system and of the container comprising such a system. It is moreover desirable to provide such an aerosol dispensing valve system, in which the dispensed product is not in contact with the propellant gas.

The first aspect of the invention is an aerosol dispensing valve system for dispensing a metered dose of product, comprising a first aerosol valve, fluidly connected with the first reservoir, wherein the first aerosol valve comprises a first releasing stem connected with a first closure, a first outlet channel for discharging the product, a first inner seal resiliently deformed by the first releasing stem, and a first body portion defining a first cavity, characterized in that the first reservoir is fluidly connected with the first cavity through the supply channel and the first cavity is fluidly connected with a dispensing container provided with resilient means for compressing the dispensing container, wherein the dispensing container is arranged in a rigid limiting container.

In a preferred embodiment of the invention, a second aerosol valve is arranged between the supply channel and the first reservoir, the said second aerosol valve comprising a second releasing stem connected with a second closure, a second inner seal resiliently deformed by the second releasing stem, and a second body portion defining a second cavity, wherein the second cavity is connected with the first reservoir and with the first cavity of the first aerosol valve through the supply channel.

In another preferred embodiment of the invention, the first aerosol valve and/or the second aerosol valve comprises a spring arranged in the cavity and exerting pressure on the closing element in the direction of the releasing stem.

In another preferred embodiment of the invention, the first outlet channel extends symmetrically along the rotational symmetry axis of the first releasing stem, forming a tubular structure.

Preferably the first reservoir is a bag.

Preferably, the rigid limiting container is hermetic, and the inner space of the limiting container is filled with gas of a pressure lower than the pressure in the first reservoir.

More preferably, the rigid limiting container is connected with a venting channel connected with the outside of the aerosol dispensing valve system.

Preferably, the resilient means are a resilient piston or a resilient spongy material or a gas spring.

Also preferably, the dispensing container provided with resilient means is a resilient dispensing container.

In a preferred embodiment of the invention, the resilient dispensing container has an initial volume equal to zero, and the preliminary internal pressure from its elasticity has a positive value lower than the pressure in the first reservoir.

In another preferred embodiment of the invention, the outlet of the supply channel is located in the first cavity, in the vicinity of the first inner seal or of the second inner seal.

The second aspect of the invention is a container for storing and dispensing a product of a predefined dose, comprising an outer casing, preferably made of aluminum, and an aerosol dispensing valve system, characterized in that the aerosol dispensing valve system is an aerosol dispensing valve system as defined in the first aspect of the invention.

The aerosol dispensing valve system of the present invention, owing to the use of a resilient dispensing container arranged in a rigid limiting container, allows an accurately metered volume of a product to be dispensed while maintaining highly repeatable doses until the container is completely emptied, this being achieved regardless of the surrounding conditions such as ambient temperature or the viscosity of the dispensed product. The hermetic limiting container filled with gas of a defined pressure lower than the pressure in the reservoir is used in the case when the propellant gas is a gas in the two-phase condition which ensures a constant pressure in the reservoir from its fully filled state to its entirely empty state. On the other hand, a dispensing valve system in which the rigid limiting container is in contact with the environment is used in the case when the propellant gas is a single-phase gas, e.g. compressed air. In this case, as the product is depleted, the pressure in the reservoir decreases from an initial value to a final value, wherein under the final pressure the resilient dispensing container fills the entire volume of the rigid limiting container, thus providing a constant dose to be dispensed from the start to the end of the product depletion process. The use of the second aerosol valve arranged between the supply channel and the first reservoir allows the filling of the resilient dispensing container, and consequently the metering of the dose to be dispensed, in an on-demand operation, without the need to simultaneously discharge the product. The construction of the aerosol dispensing valve system allows the dispensing of a product which is in the form of an aerosol, a liquid, a cream or an ointment. Moreover, the aerosol dispensing valve system has a simple construction, which does not influence the structure and external dimensions of the aerosol dispensing valve system and of the container comprising such a system. Importantly, the aerosol dispensing valve system ensures a lack of contact between the dispensed product and the propellant gas.

The subject matter of the invention is not limited to the embodiments disclosed in the attached examples and can be applied to valves of any types and configurations, without diverting from the scope of the invention. All valve constructions, their positions and their relative arrangement (including vertical, horizontal, and diagonal configurations) known to a person skilled in the art will be suitable for application in the present invention, and the given embodiments are not intended to limit the invention to the disclosed structures and types of valve systems.

Embodiments of the invention are presented in the drawing, in which

Figure 2:
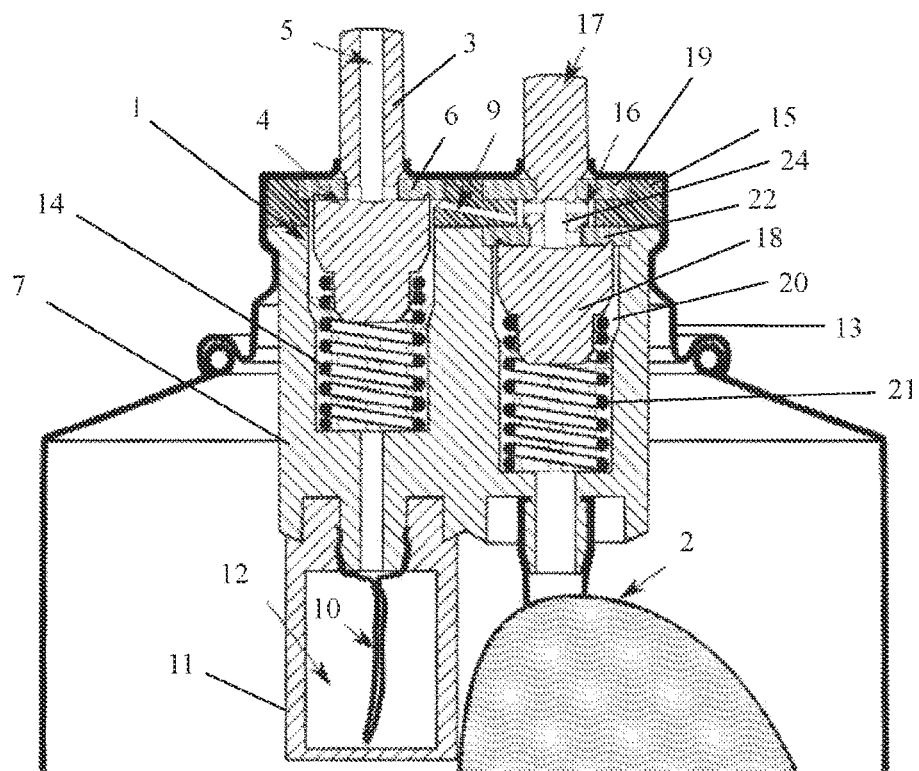
Figure 3:
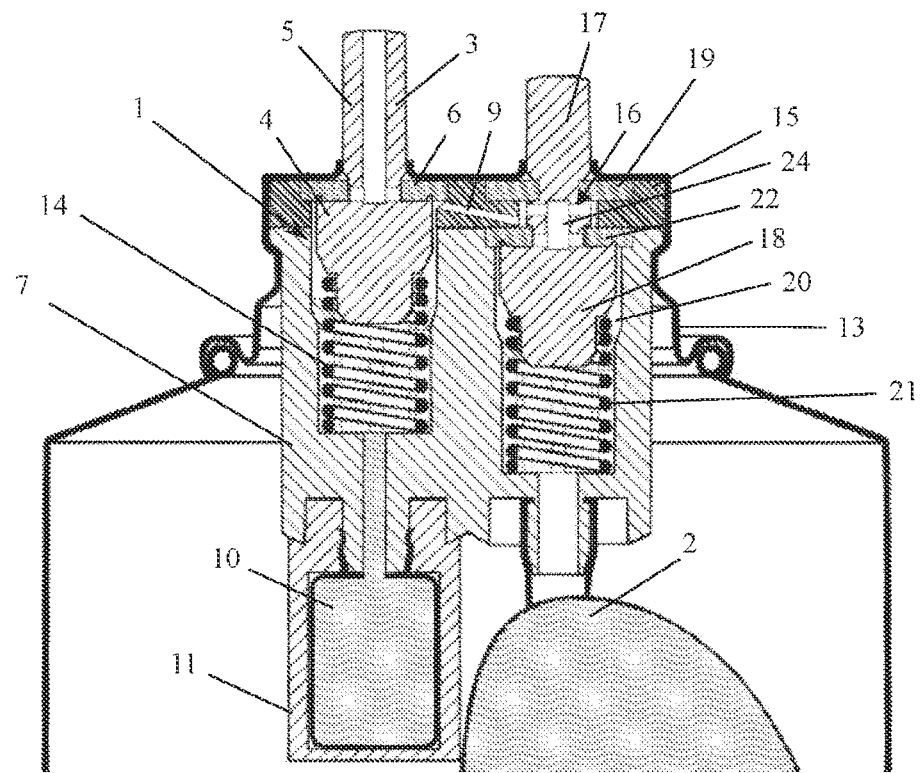
Figure 4:
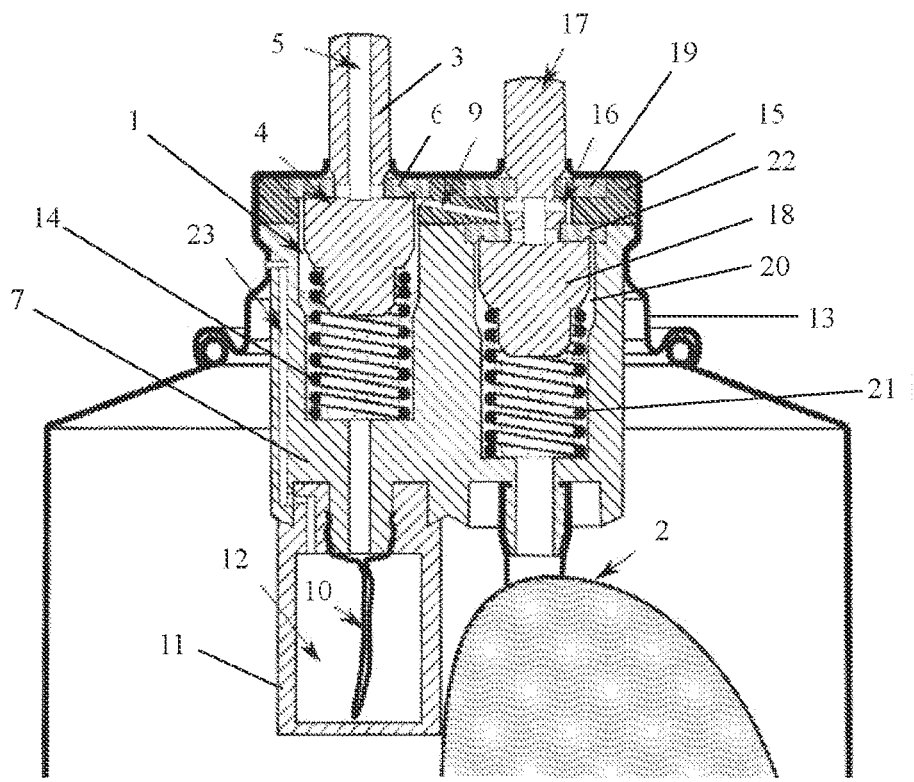
Figure 5:
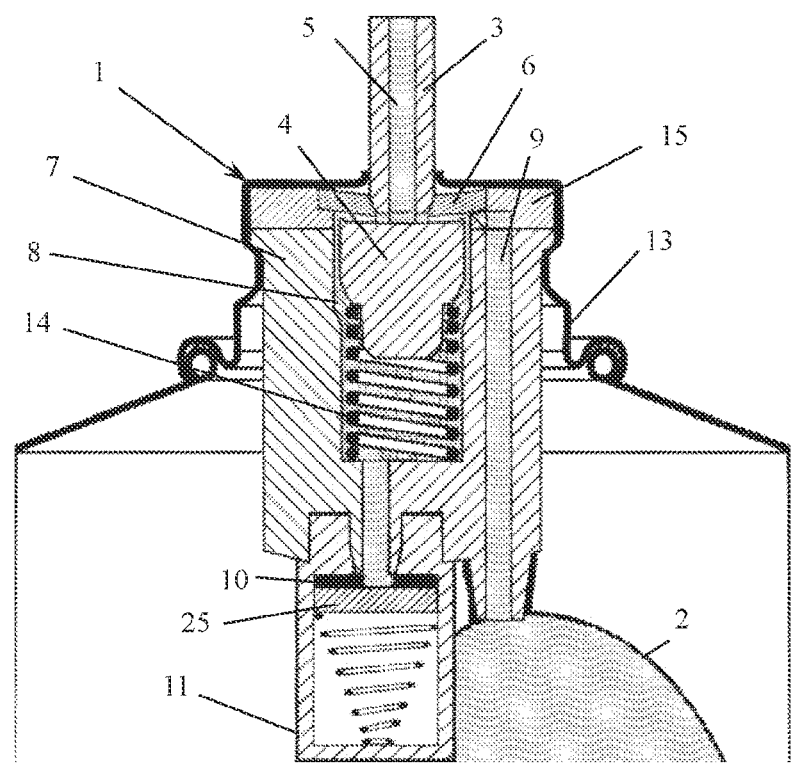
Figure 6:
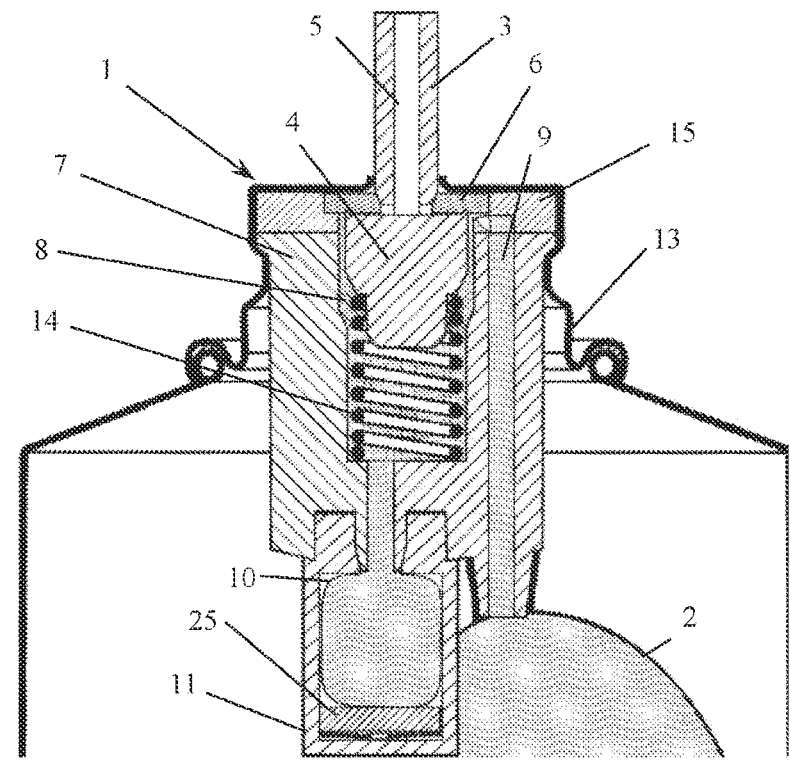
Figure 7:
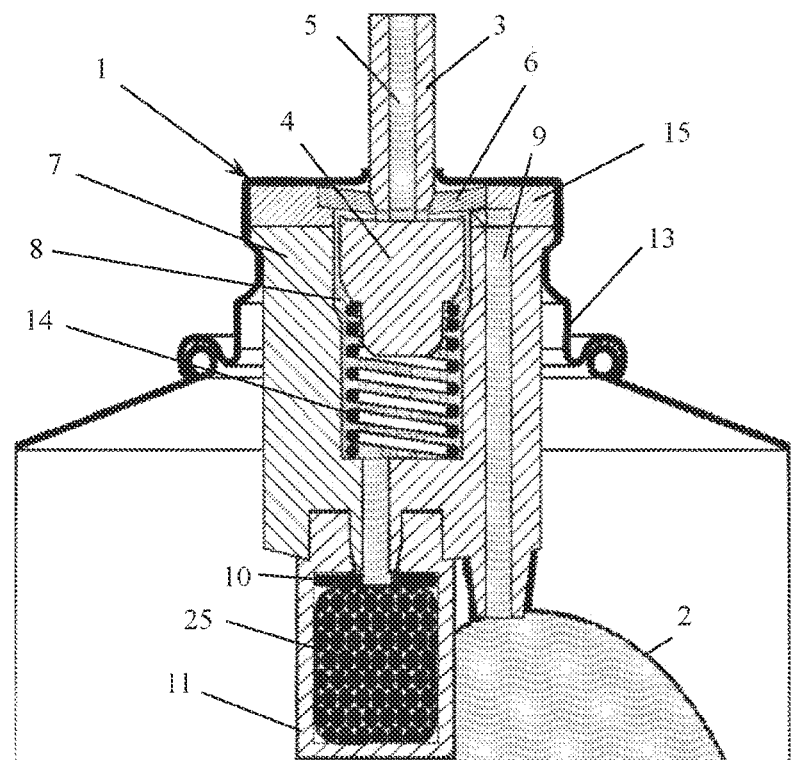
Figure 8:
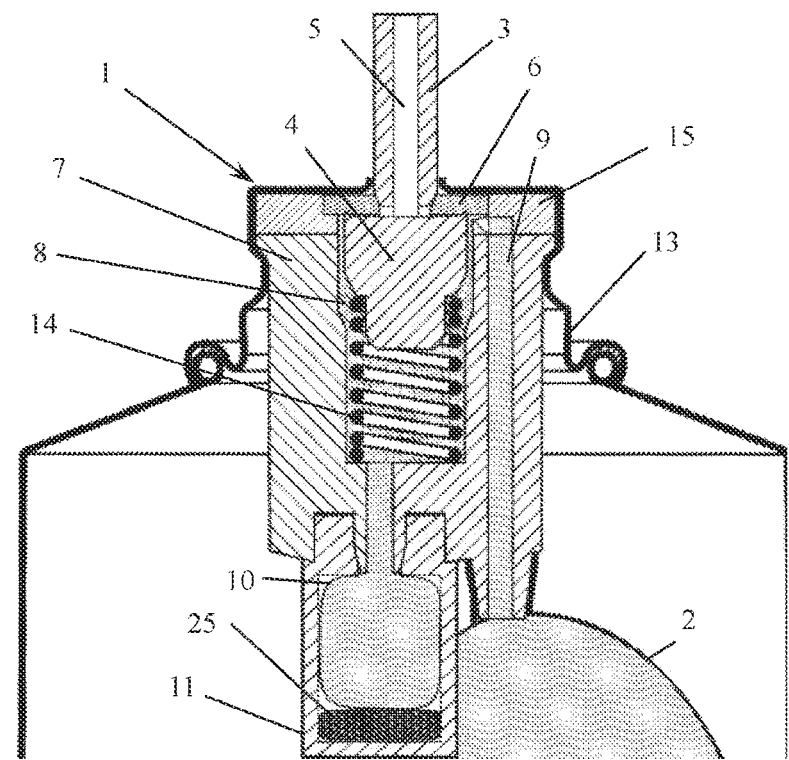
Figure 9:
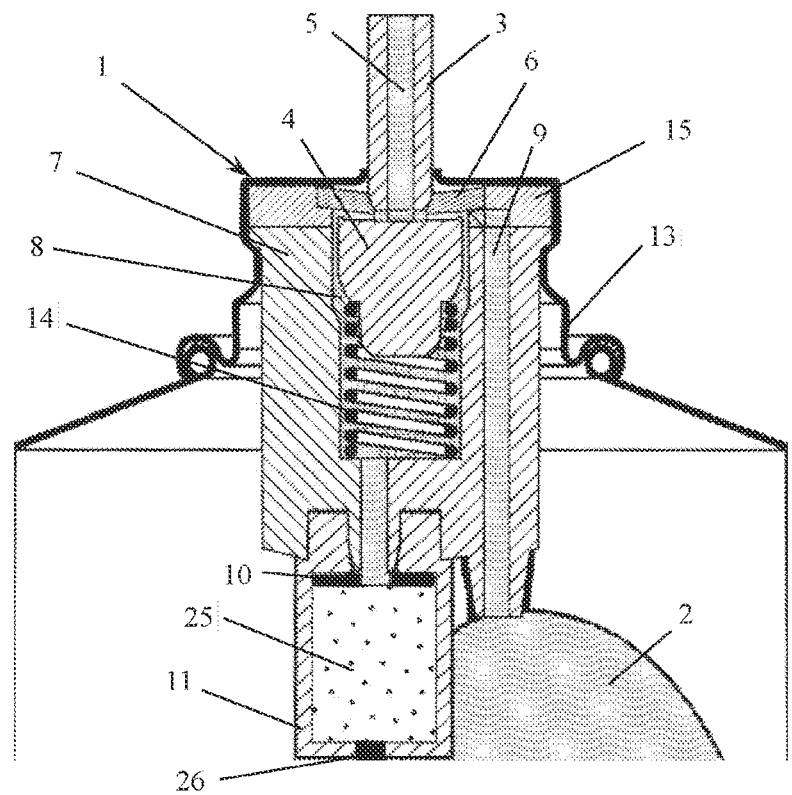
Figure 10:
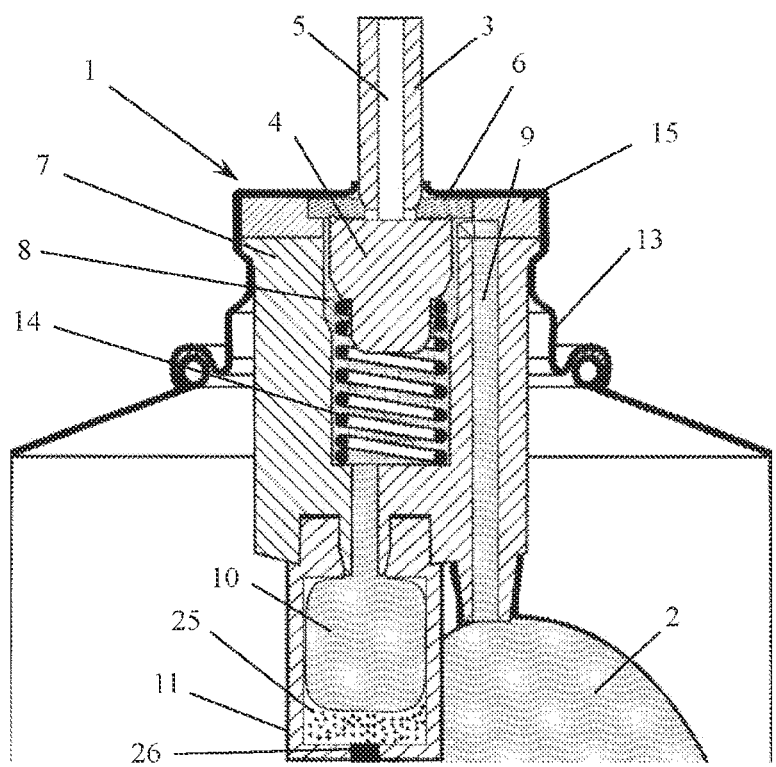
Figure 11:
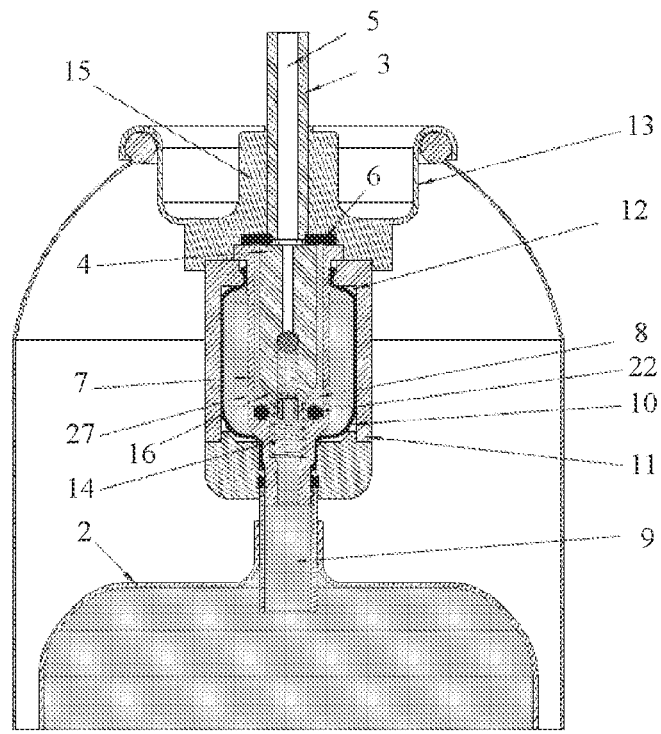
Figure 12:
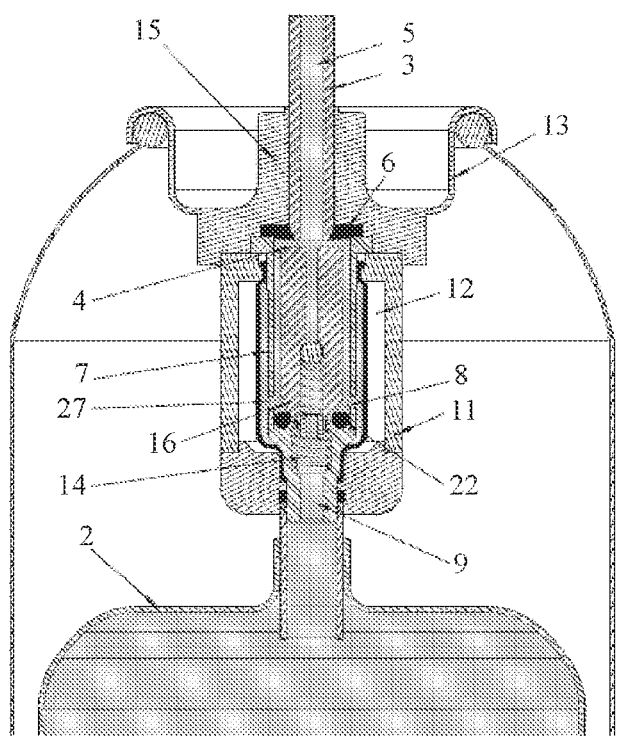

FIG. 1 shows a partial longitudinal cross-section of the container comprising the first embodiment of the aerosol dispensing valve system, FIG. 2 shows a partial longitudinal cross-section of the container comprising the second embodiment of the aerosol dispensing valve system, FIG. 3 shows a partial longitudinal cross-section of the container of FIG. 2 with the resilient dispensing container in filled state, FIG. 4 shows a partial longitudinal cross-section of the container comprising the third embodiment of the aerosol dispensing valve system, FIG. 5 shows a partial longitudinal cross-section of the container comprising the fourth embodiment of the aerosol dispensing valve system, FIG. 6 shows a partial longitudinal cross-section of the container of FIG. 5 with the dispensing container in filled state, FIG. 7 shows a partial longitudinal cross-section of the container comprising the fifth embodiment of the aerosol dispensing valve system, FIG. 8 shows a partial longitudinal cross-section of the container of FIG. 7 with the dispensing container in filled state, FIG. 9 shows a partial longitudinal cross-section of the container comprising the sixth embodiment of the aerosol dispensing valve system, FIG. 10 shows a partial longitudinal cross-section of the container of FIG. 9 with the dispensing container in filled state, FIG. 11 shows a partial longitudinal cross-section of the container comprising the seventh embodiment of the aerosol dispensing valve system, while FIG. 12 shows a partial longitudinal cross-section of the container of FIG. 11 with the dispensing container in filled state.

EXAMPLE 1

The first embodiment of the container for storing and dispensing a product of a predefined dose comprising an aerosol dispensing valve system of the present invention has been illustrated in the partial longitudinal cross-section in FIG. 1.

The container with the aerosol dispensing valve system comprises an outer casing 13 made of aluminum, a first reservoir 2 with the main product, and a first aerosol valve 1 fluidly connected with the first reservoir 2. In this embodiment, the first reservoir 2 is an elastic bag known from the Bag-On-Valve (BOV) type aerosol valves. The aerosol valve 1 used in this embodiment is a standard male valve whose construction is known to the skilled in the art. Generally, the first valve 1 comprises a first cavity 8 formed in the body 7 and is released by a tubular first releasing stem 3 with a first outlet channel 5 extending coaxially. The inner part of the first releasing stem 3 has a first closure 4 fastened thereto and adjacent from the top (in the normal rest position of the container) to a first inner seal 6 comprising a rubber flat gasket ring which surrounds the first releasing stem 3 and is deformed from the bottom by the first releasing stem 3. The first inner seal 6 is thus arranged between the upper surface of the first closure 4 and the upper part of the outer casing 13 which covers the head portion of the container for storing and dispensing a product. The upper part of the first closure 4 and the first inner seal 6 are surrounded by a head 15 which comprises a plate made of plastic, such as PVC, and which fills the head portion of the container. The first closure 4 has a shape of a tube narrowing downwards in such a manner that the upper part of the first closure 4 is a tube having a first diameter, gradually narrowing in the intermediate part, and having a stepped transition into a second diameter which is smaller than the first diameter. The first diameter and the gradual narrowing downwards of the closure 4 substantially correspond to the geometry of the first cavity 8, while ensuring that the first closure can move vertically in the first cavity 8. Moreover, the first cavity 8 has a first spring 14 arranged therein, which rests with its one end against the bottom of the first cavity 8, and with its other end against the stepped transition area of the first closure 4. The first spring 14 is arranged in the first cavity 8 and initially compressed, so that it exerts pressure on the first closure 4 in the direction of the first releasing stem 3. In the bottom of the first cavity 8, there is formed a channel extending through the body 7 to the cylindrical fastening arranged at the bottom end of the body 7. There is a rigid limiting container 11 fitted to the cylindrical fastening. In this embodiment, the rigid limiting container 11 is a hermetically closed compartment, the inner space 12 of which is filled with gas—air—having an initial first pressure lower than the pressure in the first reservoir 2. The volume of the rigid limiting container 11 allows the metering of the dispensed dose. There is a dispensing container 10 arranged in the inner space 12 of the rigid limiting container 11, the dispensing container 10 being provided with resilient means 25, which exert a pressure on the dispensing container 10 and cause it to compress. In this embodiment of the invention, the dispensing container 10 together with the resilient means 25 was embodied as a resilient material which ensures that the dispensing container 10 is continuously compressed. A material suitable for the construction of the dispensing container 10, which would provide a bulk modulus of the dispensing container 10 for the purpose of accumulating energy from the pressure of the product introduced into the dispensing container 10, can be latex rubber or silicone rubber, in particular rubber approved for contact with food or pharmaceutical products. In a situation when no pressurized agent is being delivered to the resilient dispensing container 10, the dispensing container is completely empty. As can be seen in FIG. 1, the dispensing container 10 is hermetically connected with the cylindrical fastening of the body 7.

The first reservoir 2 containing the main product for being dispensed is fluidly connected with the first cavity 8 of the first aerosol valve 1 via the supply channel 9 extending through the body 7. In the upper part of the first valve 1, where the head 15 is arranged, the supply channel 9 changes from extending vertically to extending at an angle, and its outlet is located on the sloping wall of the first cavity 8, in the vicinity of the first inner seal 6.

The aerosol dispensing valve system operates in the following steps. In the rest position of the first releasing stem 3, the product stored at a certain pressure in the first reservoir 2 flows through the supply channel 9 to the first cavity 8 of the first aerosol valve 1 and further, via the channel extending through the body 7, to the resilient dispensing container 10. The resilient dispensing container 10 takes the energy from the pressure of the product and expands to the volume limited by the volume of the rigid limiting container 11, compressing the gas present in (filling) the limiting container 11 to the state of equilibrium.

Such a solution can be used in the case when the propellant gas is a gas in the two-phase condition which ensures a constant pressure in the first reservoir 2, from its fully filled state to its entirely empty state.

Next, pressing the first releasing stem 3 opens the first aerosol valve 1. The vertical movement downwards of the first releasing stem 3 also causes the first inner seal 6 to deform in such a manner that it covers and simultaneously closes the outlet of the supply channel 9 fluidly connected with the first reservoir 2. Moreover, the vertical movement downwards of the first releasing stem 3 causes a channel extending transversely in the first releasing stem 3 and located in the vicinity of the connection between the first releasing stem 3 and the first closure 4 to be uncovered, thereby opening the first aerosol valve 1. While the first aerosol valve 1 remains open, the elastic strain energy of the resilient dispensing container 10 and the energy of the gas compressed in the rigid limiting container 11 cause the resilient dispensing container 10 to be emptied in a precisely defined dose equal to the volume of the rigid limiting container 11 reduced by the volume of the gas compressed in the rigid limiting container 11. In such a case, the product stored in the resilient dispensing container 10 is discharged from the resilient dispensing container 10 into the first cavity 8 and further, via the first outlet channel 5, outside of the aerosol dispensing valve system.

In an alternative embodiment of the invention, the resilient dispensing container 10 can be selected in such a manner that its initial volume is equal to zero, and the preliminary internal pressure from its elasticity has a positive value lower than the pressure in the first reservoir 2.

After the first releasing stem 3 is released, it returns to its initial position, moved by the pressure caused by the first spring 14. In such a case, the inlet channel extending perpendicularly in the first releasing stem 3 is closed by being sealed with the first inner seal 6, and the return deformation of the first inner seal 6 opens the outlet of the supply channel 9, thus opening a passage for the product stored in the first reservoir 2 to fill again the resilient dispensing container 10 up to the volume limited by the rigid limiting container 11.

EXAMPLE 2

The second embodiment of the container for storing and dispensing a product of a predefined dose comprising an aerosol dispensing valve system according to the present invention has been illustrated in the partial longitudinal cross-sections in FIGS. 2 and 3.

The container with the aerosol dispensing valve system is similar in construction to the construction of the container with the aerosol dispensing valve system presented in the first embodiment, and therefore similar components will not be described again for the clarity of this description of the invention.

Unlike in the first embodiment of the invention, the second embodiment of the container with the aerosol dispensing valve system comprises a second aerosol valve 16. The second aerosol valve 16, having a construction substantially similar to the first aerosol valve 1, is arranged between the first reservoir 2 and the supply channel 9. The second aerosol valve 16 comprises a vertically extending second releasing stem 17, which in this embodiment is a blind releasing stem connected with a second closure 18. There is a second cavity 20 formed in the common body 7. The construction and geometry of the second closure 18 and of the second cavity 20 are substantially similar to the construction and geometry of the first closure 4 and of the first cavity 8 and therefore for clarity they will not be described again here. The second releasing stem 17 is sealed from above with an additional seal 19 arranged in the area of the head 15, in the vicinity of the upper part of the outer casing 13. Inside the second cavity 20, there is located an initially compressed second spring 21, which exerts pressure on the second closure 18 in the direction of the second releasing stem 17. Between the upper surface of the second closure 18 and the head 15, there is arranged a second inner seal 22 which—similarly to the additional seal 19 and the first inner seal 6—is a rubber flat gasket ring. The second releasing stem 17 comprises a through channel 24 which connects in the lower part of the second releasing stem 17, in the connection area of the second releasing stem 17 with the second closure 18, to a perpendicularly extending channel, which is closed by the second inner seal 22 when the second aerosol valve 16 is in closed position. In its upper part, the through channel 24 connects to the perpendicularly extending channel arranged in the second aerosol valve 16, in the area between the additional seal 19 and the second inner seal 22, the second aerosol valve 16 being in the closed position. The supply channel 9 extends at an angle through the head 15 and its one outlet is located in the first cavity 8, in the vicinity of the first inner seal 6, and its other outlet is located in the area between the additional seal 19 and the second inner seal 22, in the vicinity of the channel perpendicularly extending from the through channel 24.

The aerosol dispensing valve system operates in the following steps. After the second releasing stem 17 is pressed, the second aerosol valve 16 is opened. The vertical movement downwards of the second releasing stem 17 causes the perpendicular channel located in the connection area of the second releasing stem 17 with the second closure 18 to be moved downwards, and thereby to be opened to the second cavity 20. The product contained in the first reservoir 2 flows into the second cavity 20 and then, via the through channel 24, to the supply channel 9, and further via the first cavity 8 to the dispensing container 10, which is provided with resilient means 25 and which is in this embodiment, as was in the first embodiment, the resilient dispensing container 10 made of an elastic material. The resilient dispensing container 10 takes the energy from the pressure of the product and expands to the volume of the rigid limiting container 11, compressing the gas present in it to the state of equilibrium. This situation is illustrated in FIG. 3, in which the resilient dispensing container 10 is in the fully expanded state and fills entirely the inner space 12 of the rigid limiting container 11. The releasing of the second releasing stem 17 causes the perpendicular channel and the through channel 24 connected with the perpendicular channel to be closed.

The subsequent pressing of the first releasing stem 3 causes the first aerosol valve 1 to be opened and a predefined dose of the product contained in the resilient dispensing container 10 to be discharged. Releasing of the first releasing stem 3 causes the first aerosol valve 1 to be closed again.

EXAMPLE 3

The third embodiment of the container for storing and dispensing a product of a predefined dose comprising an aerosol dispensing valve system according to the present invention has been illustrated in the partial longitudinal cross-section in FIG. 4.

The container with the aerosol dispensing valve system is similar in construction to the construction of the container with the aerosol dispensing valve system presented in the second embodiment, and therefore similar components will not be described again for the clarity of this description of the invention.

Unlike in the second embodiment of the invention, the third embodiment of the container with the aerosol dispensing valve system comprises a venting channel 23, which extends from the rigid limiting container 11 through the body 7 to the outside of the aerosol dispensing valve system, thereby connecting the inner space 12 of the limiting container 11 with the environment of the container for storing and dispensing a product of a predefined dose. Such a system can be used when the propellant gas is a single-phase gas, e.g. compressed air. In this case, as the product becomes increasingly depleted, the pressure in the first reservoir 2 decreases from an initial value (reservoir 2 full) to a final value (reservoir 2 empty).

The resilient dispensing container 10 is designed in such a way that under the final pressure it fills the entire inner space 12 of the rigid limiting container 11, thus providing a constant dose to be dispensed from the start to the end of emptying the first reservoir 2.

In an alternative embodiment of the invention, the resilient dispensing container 10 can be selected in such a manner that its initial volume is equal to zero, and the preliminary internal pressure from its elasticity has a positive value lower than the pressure in the first reservoir 2.

EXAMPLE 4

The fourth embodiment of the container for storing and dispensing a product of a predefined dose comprising an aerosol dispensing valve system according to the present invention has been illustrated in the partial longitudinal cross-sections in FIGS. 5 and 6.

The container with the aerosol dispensing valve system is similar in construction to the construction of the container with the aerosol dispensing valve system presented in the first embodiment, and therefore similar components will not be described again for the clarity of this description of the invention.

Unlike in the first embodiment of the invention, the fourth embodiment of the container with the aerosol dispensing valve system comprises resilient means 25 exerting pressure on the dispensing container 10, wherein the resilient means 25 are not an integrated structure of the resilient dispensing container 10, as was the case in example 1, but instead are made in the form of a resilient piston. The resilient piston is arranged in the rigid limiting container 11 and has a piston part and a spring which rests against the bottom part of the rigid limiting container 11. FIG. 5 shows the aerosol dispensing valve system, in which the dispensing container 10 is empty, and the resilient means 25 in the form of a resilient piston are in the fully expanded position, compressing entirely the dispensing container 10. In this embodiment, the dispensing container 10 may be made of an elastic material such as for example the first reservoir 2, in the form of a bag known from the Bag-on-Valve systems. In order to allow it to be more precisely emptied, the dispensing container 10 may be made in the form of a harmony or a bellows.

After the procedure of filling the dispensing container 10 is started, the product delivered under pressure exerts a force on the resilient means 25 and overcomes their compressive force, "accumulating" the energy of the pressurized product. Thereby the dispensing container 10 expands to the volume limited by the volume of the rigid limiting container 11 with allowance for the space occupied by the compressed resilient means 25 (see FIG. 6).

EXAMPLE 5

The fifth embodiment of the container for storing and dispensing a product of a predefined dose comprising an aerosol dispensing valve system according to the present invention has been illustrated in the partial longitudinal cross-sections in FIGS. 7 and 8.

The container with the aerosol dispensing valve system is similar in construction to the construction of the container with the aerosol dispensing valve system presented in the first and in the fourth embodiments, and therefore similar components will not be described again for the clarity of this description of the invention.

Unlike in the first and in the fourth embodiments of the invention, the fifth embodiment of the container with the aerosol dispensing valve system comprises resilient means 25 exerting pressure on the dispensing container 10, wherein the resilient means 25 are neither an integrated structure of the resilient dispensing container 10, as was the case in example 1, nor a resilient piston, as was the case in example 4, but are instead made in the form of a resilient spongy material. The spongy material which in this embodiment represents the resilient means 25 may be an elastic medical silicone.

The operating principle of the aerosol dispensing valve system in which the resilient spongy material is used in place of the resilient piston is analogous, and therefore this description will not be repeated for the clarity of this disclosure.

EXAMPLE 6

The sixth embodiment of the container for storing and dispensing a product of a predefined dose comprising an aerosol dispensing valve system according to the present invention has been illustrated in the partial longitudinal cross-sections in FIGS. 9 and 10.

The container with the aerosol dispensing valve system is similar in construction to the construction of the container with the aerosol dispensing valve system presented in the first, fourth and fifth embodiments, and therefore similar components will not be described again for the clarity of this description of the invention.

Unlike in the first, fourth and fifth embodiments of the invention, the sixth embodiment of the container with the aerosol dispensing valve system comprises resilient means 25 exerting pressure on the dispensing container 10, wherein the resilient means 25 are neither an integrated structure of the resilient dispensing container 10, as was the case in example 1, nor a resilient piston, as was the case in example 4, nor a resilient spongy material, as was the case in example 5, but are instead made in the form of a gas spring. In this embodiment, the gas spring is nitrogen pumped into the rigid limiting container 11 under an appropriate pressure. The nitrogen being the gas spring is pumped at the stage of installing the rigid limiting container 11 together with the dispensing container 10, through a self-vulcanizing valve 26. The presented self-vulcanizing valve 26 self-closes after the removal of the needle which pumps the propellant gas functioning as the gas spring. The operating principle of the aerosol dispensing valve system in which the gas spring is used in place of the elastic piston or the elastic spongy material is analogous, and therefore this description will not be repeated for the clarity of this disclosure.

EXAMPLE 7

The seventh embodiment of the container for storing and dispensing a product of a predefined dose comprising an aerosol dispensing valve system according to the present invention has been illustrated in the partial longitudinal cross-sections in FIGS. 11 and 12.

The container with the aerosol dispensing valve system is similar in construction to the construction of the container with the aerosol dispensing valve system presented in the first embodiment, and therefore similar components will not be described again for the clarity of this description of the invention.

Unlike in the first embodiment of the invention, the seventh embodiment of the container with the aerosol dispensing valve system has a supply channel 9, which is fluidly connected in the lower part of the valve with the dispensing container 10 via the open second valve 16, the cavity 8 and apertures 27. The dispensing container 10 cylindrically surrounds the body 7 of the first valve 1 and of the second valve 16.

LIST OF REFERENCE NUMERALS

1—first aerosol valve
2—first reservoir
3—first releasing stem
4—first closure
5—first outlet channel
6—first inner seal
7—body
8—first cavity 9—supply channel
10—dispensing container
11—rigid limiting container
12—inner space of the limiting container
13—outer casing
14—first spring
15—head
16—second aerosol valve
17—second releasing stem
18—second closure
19—additional seal
20—second cavity
21—second spring
22—second inner seal
23—venting channel
24—through channel
25—resilient means
26—self-vulcanizing valve
27—aperture

What is claimed is:

1. A container for storing and dispensing a product of a predefined dose, comprising an outer casing and an aerosol dispensing valve system, the aerosol dispensing valve system comprising a first aerosol valve, fluidly connected with the first reservoir, wherein the first aerosol valve comprises a first releasing stem connected with a first closure, a first outlet channel for discharging the product, a first inner seal resiliently deformed by the first releasing stem, and a first body portion defining a first cavity, wherein the first aerosol valve is selectively changeable between a first aerosol valve open state and a first aerosol valve closed state, the first aerosol valve is operative to discharge the product through the first outlet channel when the first aerosol valve is in the first aerosol valve open state, the first reservoir is fluidly connected to the first cavity through a supply channel, the first cavity is fluidly connected with a dispensing container arranged in an interior of the container and provided with resilient means for compressing the dispensing container, the dispensing container is arranged in an inner space of a rigid limiting container and is separated by the rigid limiting container from the interior of the container, when the first aerosol valve is in the first aerosol valve closed state the product flows from the first reservoir through the supply channel to the dispensing container that expands to a volume limited by a volume of the rigid limiting container, and after the first aerosol valve is selectively changed from the first aerosol closed state to the first aerosol open state, the product flows from the dispensing container through the first cavity, the first outlet channel outside the aerosol dispensing valve system and the supply channel is closed by the resiliently deformed first inner seal.

2. The container of claim 1, wherein a second aerosol valve is arranged between the supply channel and the first reservoir, the second aerosol valve comprising a second releasing stem connected with a second closure, a second inner seal resiliently deformed by the second releasing stem, and a second body portion defining a second cavity, wherein the second cavity is connected with the first reservoir and with the first cavity of the first aerosol valve through the supply channel.

3. The container of claim 2, wherein the first aerosol valve comprises a spring arranged in the first cavity, the spring exerting pressure on the first closure in the direction of the first releasing stem and the second aerosol valve comprises a spring arranged in the second cavity, the spring exerting pressure on the second closure in the direction of the second releasing stem.

4. The container of claim 1, wherein the first outlet channel extends symmetrically along the rotational symmetry axis of the first releasing stem, forming a tubular structure.

5. The container of claim 1, wherein the first reservoir is a bag.

6. The container of claim 1, wherein the rigid limiting container is hermetic, and the inner space of the rigid limiting container is filled with gas of a pressure lower than the pressure in the first reservoir.

7. The container of claim 1, wherein the rigid limiting container is connected with a venting channel connected with the outside of the aerosol dispensing valve system.

8. The container of claim 1, wherein the resilient means is a resilient piston or a resilient spongy material or a gas spring.

9. The container of claim 1, wherein the dispensing container provided with the resilient means is a resilient dispensing container.

10. The container of claim 9, wherein the resilient dispensing container has an initial volume equal to zero, and the preliminary internal pressure from its elasticity has a positive value lower than the pressure in the first reservoir.

11. The container of claim 1, wherein the outlet of the supply channel is located in the first cavity, in the vicinity of the first inner seal or of the second inner seal.

12. The container of claim 1, wherein the aerosol dispensing valve system further comprises a second aerosol valve arranged between the supply channel and the first reservoir, the second aerosol valve comprising a second releasing stem connected with a second closure, a second inner seal resiliently deformed by the second releasing stem, and a second body portion defining a second cavity, wherein the second cavity is connected with the first reservoir and with the first cavity of the first aerosol valve through the supply channel.

13. The container of claim 1, wherein the first aerosol valve comprises a spring arranged in the first cavity, the spring exerting pressure on the first closure in the direction of the first releasing stem and the second aerosol valve comprises a spring arranged in the second cavity, the spring exerting pressure on the second closure in the direction of the second releasing stem.

14. The container of claim 1, wherein the rigid limiting container is hermetic, and the inner space of the rigid limiting container is filled with gas of a pressure lower than the pressure in the first reservoir and the rigid limiting container is connected with a venting channel connected with the outside of the aerosol dispensing valve system.

15. The container of claim 1, wherein the dispensing container provided with the resilient means is a resilient dispensing container, the resilient dispensing container having an initial volume equal to zero, and the preliminary internal pressure from its elasticity has a positive value lower than the pressure in the first reservoir.

16. The container of claim 1, wherein the outer casing of the container is made of aluminum.

17. The container of claim 8, wherein the resilient means is a resilient spongy material.

* * * * *